(No Model.)
R. A. WENTWORTH.
FISH TRAP OR SPRING HOOK.
No. 283,444. Patented Aug. 21, 1883.
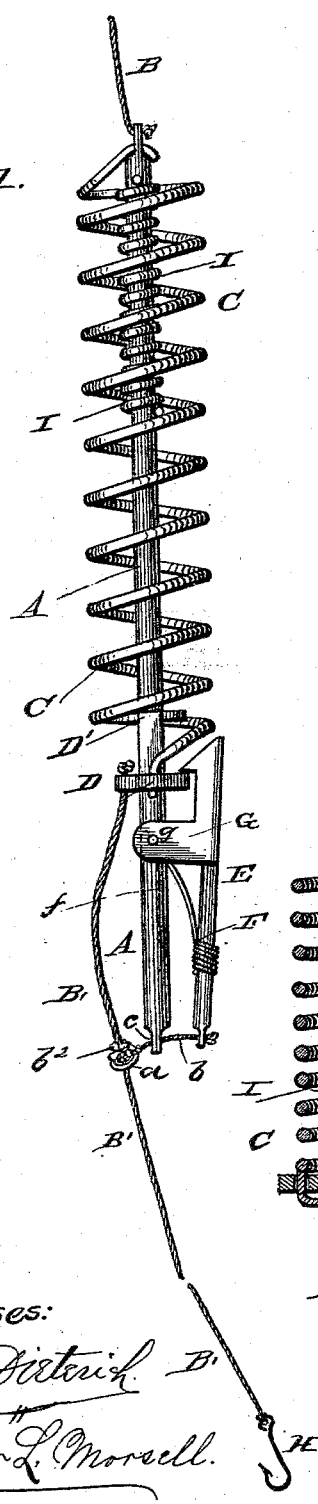
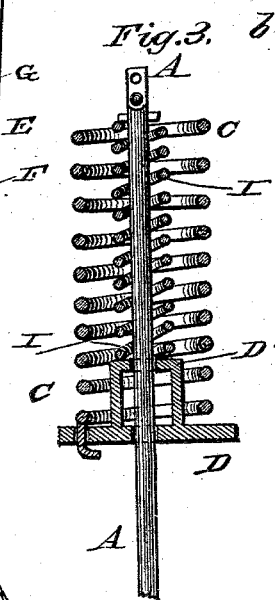
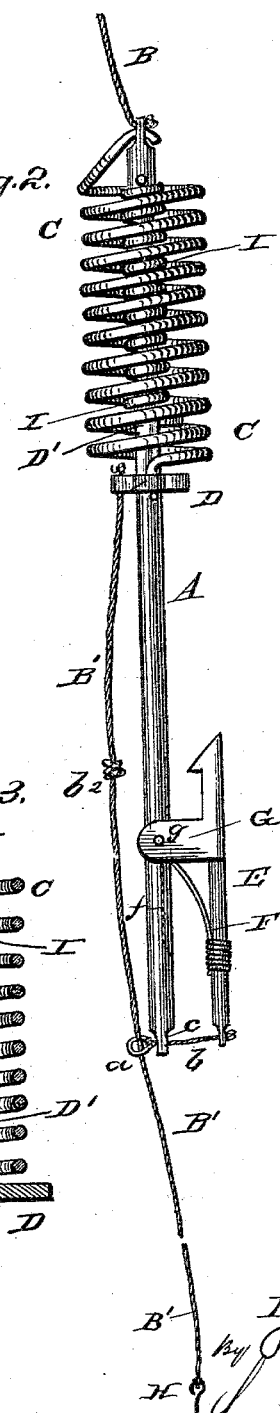
Witnesses:
Phil. C. Dieterich
Arthur L. Morsell
Inventor,
by R. A. Wentworth.
Louis Bagger & Co.
Attorneys.

UNITED STATES PATENT OFFICE.

RICHMOND A. WENTWORTH, OF APPLETON, MAINE.

FISH-TRAP OR SPRING-HOOK.

SPECIFICATION forming part of Letters Patent No. 283,444, dated August 21, 1883.

Application filed March 26, 1883. (No model.)

*To all whom it may concern:*

Be it known that I, RICHMOND A. WENTWORTH, of Appleton, in the county of Knox and State of Maine, have invented certain new and useful Improvements in Fish-Traps or Spring-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved fish-trap, showing the trap "set." Fig. 2 is a similar view showing the trap "sprung," and Fig. 3 is a longitudinal sectional view through the top part of the device.

Similar letters of reference indicate corresponding parts in all the figures.

My invention has relation to that class of spring attachments for fishing-lines in which the bait, hook, and line, when pulled by the fish taking the bait, operate a trigger, releasing the spring so as to suddenly jerk the hook into the mouth of the fish biting; and it consists in a certain improvement upon the fish-trap for which Letters Patent of the United States No. 263,638 were granted to me on the 29th day of August, 1882, which said improvement will be hereinafter more fully described and claimed.

In the accompanying drawings, the letter A represents a metal rod, which has an eye or hole at its upper end for the attachment of the fishing-line. (Shown at B.) Encircling the upper end of this rod, and fastened with one end near its top, is a coiled spring, C, the lower end of which is fastened in a cross-piece, D, which slides upon the rod A.

To the cross-piece D is fastened the lower part, B′, of the fishing-line, to which the bait-hook H is attached. This part of the line passes down along rod A, and through a small ring or eye, $a$, which is connected by a small piece of cord or wire, $b$, which passes through the eye $c$ in the lower end of rod A to the lower end of the trigger. Upon the trigger E is placed a spring, F, the free end of which bears against the lower part of rod A, which is grooved longitudinally at $f$ to receive the end of the spring and prevent it from slipping sidewise. By moving this spring F up or down upon the trigger, the force or power required to spring the trap may be adjusted at pleasure, according to the size and species of fish which it is desired to catch. The upper part of the trigger has a short arm, G, by which it is hinged to rod A by the pin $g$.

Around the top part of rod A, inside of the coiled spring C, is placed another small coiled spring, I, against which the step or shoulder D′ of the cross-head D will strike when the trap is sprung. Thus it will be seen that this inside spring, I, cushions the stroke of the cross-head when the trap is sprung, causing it to work easily and without any sudden rebounding. It will also be seen that I dispense with the use of sheaves for the passage of the lower part of the fishing-line, which simply passes from the cross-head D, to which it is fastened, through the eye $a$ at the lower end of the device, the line B′ having a knot, $b^2$, which, on pulling on the line, when the fish bites, will pull on cord $b$, and thus "spring" the trigger by disengaging its hooked end from the cross-head D, when spring C will jerk the hook into the mouth of the fish.

Having thus described my invention, I claim and desire to secure by Letters Patent of the United States—

1. The herein-described fish-trap or spring-hook, consisting of the rod A, spring I, spring C, sliding cross-head D D′, trigger E, having the adjustable spring F, and connected by a cord or wire, $b$, with eye $a$, and hook-line B′, passing through said eye $a$, all constructed and combined to operate substantially as and for the purpose shown and set forth.

2. The combination, in a fish-trap or spring-hook of the described class, of the rod A, spring C, having cross-head D D′, and cushion-spring I, substantially as and for the purpose herein shown and set forth.

In testimony that I claim the foregoing as my own I have hereunto affixed my signature in presence of two witnesses.

RICHMOND A. WENTWORTH.

Witnesses:
STEPHEN J. GUSHEE,
ALBERT H. NEWBERT.